(12) United States Patent
Hanchett et al.

(10) Patent No.: US 10,594,795 B2
(45) Date of Patent: Mar. 17, 2020

(54) SYSTEMS AND METHODS FOR FILTERING MESSAGES

(71) Applicant: TASER International, Inc., Scottsdale, AZ (US)

(72) Inventors: Mark A. Hanchett, Mesa, AZ (US); Reinhard J. Gagnon, Rimrock, AZ (US); Rick Wong, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 86 days.

(21) Appl. No.: 15/379,853

(22) Filed: Dec. 15, 2016

(65) Prior Publication Data
US 2017/0195422 A1 Jul. 6, 2017

Related U.S. Application Data

(60) Provisional application No. 62/273,899, filed on Dec. 31, 2015.

(51) Int. Cl.
H04L 29/08 (2006.01)

(52) U.S. Cl.
CPC ............ *H04L 67/12* (2013.01); *H04L 67/146* (2013.01)

(58) Field of Classification Search
CPC ....... H04L 67/12; H04L 67/146; H04L 67/26; G06Q 50/26
See application file for complete search history.

(56) References Cited

U.S. PATENT DOCUMENTS

| 7,181,495 B2* | 2/2007 | Skladman ............... H04L 51/12 709/203 |
| 8,131,281 B1* | 3/2012 | Hildner ............... H04L 41/0806 455/418 |
| 8,849,205 B2 | 9/2014 | Desai |

(Continued)

FOREIGN PATENT DOCUMENTS

| CN | 103237169 A | 4/2013 |
| WO | 2005081477 A1 | 9/2005 |
| WO | 2013181778 A1 | 6/2012 |

OTHER PUBLICATIONS

International Searching Authority, International Search Report for the International Patent Application No. PCT/US2016/066887 dated Apr. 3, 2017.

(Continued)

*Primary Examiner* — Aftab N. Khan
*Assistant Examiner* — Anh Nguyen
(74) *Attorney, Agent, or Firm* — Letham Law Firm

(57) ABSTRACT

A recording system may use the information stored in a list to determine whether to receive and/or respond to messages transmitted by notice systems. The source of the information for the list includes a server and/or the recording system itself. A server that provides the list may use data provided by an agency to determine a relationship between a people, recording devices and notice systems. The associations between people, recording devices and notice devices may be used to determine what information is in the list. A recording device that forms the list may receive messages from any notice system, detect the session identifier, store the session identifiers from received messages, and receive and/or respond to messages in accordance with the list formed by the recording system.

16 Claims, 7 Drawing Sheets

(56) References Cited

U.S. PATENT DOCUMENTS

| | | | |
|---|---|---|---|
| 8,879,981 B2 | 11/2014 | Fujita | |
| 9,118,740 B2 | 8/2015 | Anderson | |
| 9,819,896 B2* | 11/2017 | Waniguchi | H04N 5/77 |
| 2004/0263914 A1 | 12/2004 | Yule et al. | |
| 2005/0132197 A1 | 6/2005 | Medlar | |
| 2007/0070574 A1 | 3/2007 | Nerheim et al. | |
| 2012/0009914 A1* | 1/2012 | Lee | H04L 12/2814 |
| | | | 455/420 |
| 2013/0344850 A1 | 12/2013 | Odinak | |
| 2014/0188348 A1 | 7/2014 | Gautama | |
| 2014/0223178 A1* | 8/2014 | Islam | H04L 63/0876 |
| | | | 713/168 |
| 2015/0120869 A1 | 4/2015 | Watanabe | |
| 2015/0220762 A1 | 8/2015 | Jiang | |
| 2016/0042767 A1* | 2/2016 | Araya | G11B 19/02 |
| | | | 386/201 |
| 2016/0261735 A1* | 9/2016 | Candelore | H04M 1/72577 |
| 2016/0301675 A1* | 10/2016 | Wiles | H04L 63/083 |
| 2017/0086192 A1* | 3/2017 | Bohlander | H04W 4/025 |

OTHER PUBLICATIONS

European Patent Office, Extended European Search Report for European Patent Application No. 16882327.6 dated Jul. 9, 2019.

\* cited by examiner

200

| RECORDING SYSTEM NO. 1 212 | 214 | NOTICE SYSTEM TYPES:<br><br>TYPE 1<br>TYPE 2<br>⋮<br>TYPE N |
| --- | --- | --- |
| | 216 | NOTICE OPERATING STATES: (DATA MASKS)<br><br>SYSTEM TYPE 1:  MASK 1<br>SYSTEM TYPE 1:  MASK 2<br>⋮                    ⋮<br>SYSTEM TYPE 1:  MASK N<br>SYSTEM TYPE 2:  MASK 1<br>SYSTEM TYPE 2:  MASK 2<br>⋮                    ⋮<br>SYSTEM TYPE 2:  MASK N<br>⋮<br>SYSTEM TYPE N:  MASK 1 |
| | 218 | NOTICE SYSTEM IDENTIFIERS:<br><br>SYSTEM IDENTIFIER 1<br>SYSTEM IDENTIFIER 2<br>SYSTEM IDENTIFIER N |
| RECORDING SYSTEM NO. 2 222 | | DATA 224 |
| RECORDING SYSTEM NO. N 232 | | DATA 234 |

SYSTEMS AND METHODS FOR FILTERING MESSAGES

BRIEF DESCRIPTION OF THE SEVERAL VIEWS OF THE DRAWING

Embodiments of the present invention will be described with reference to the drawing, wherein like designations denote like elements, and:

FIG. 2 is a diagram that shows an example of an embodiment of a list prepared by an evidence management system;

FIG. 7 is a swim lane diagram that shows an example of an embodiment of the functions performed by a notice system, a recording system, and an evidence management system and the communications there between.

DETAILED DESCRIPTION OF INVENTION

Figure 1:
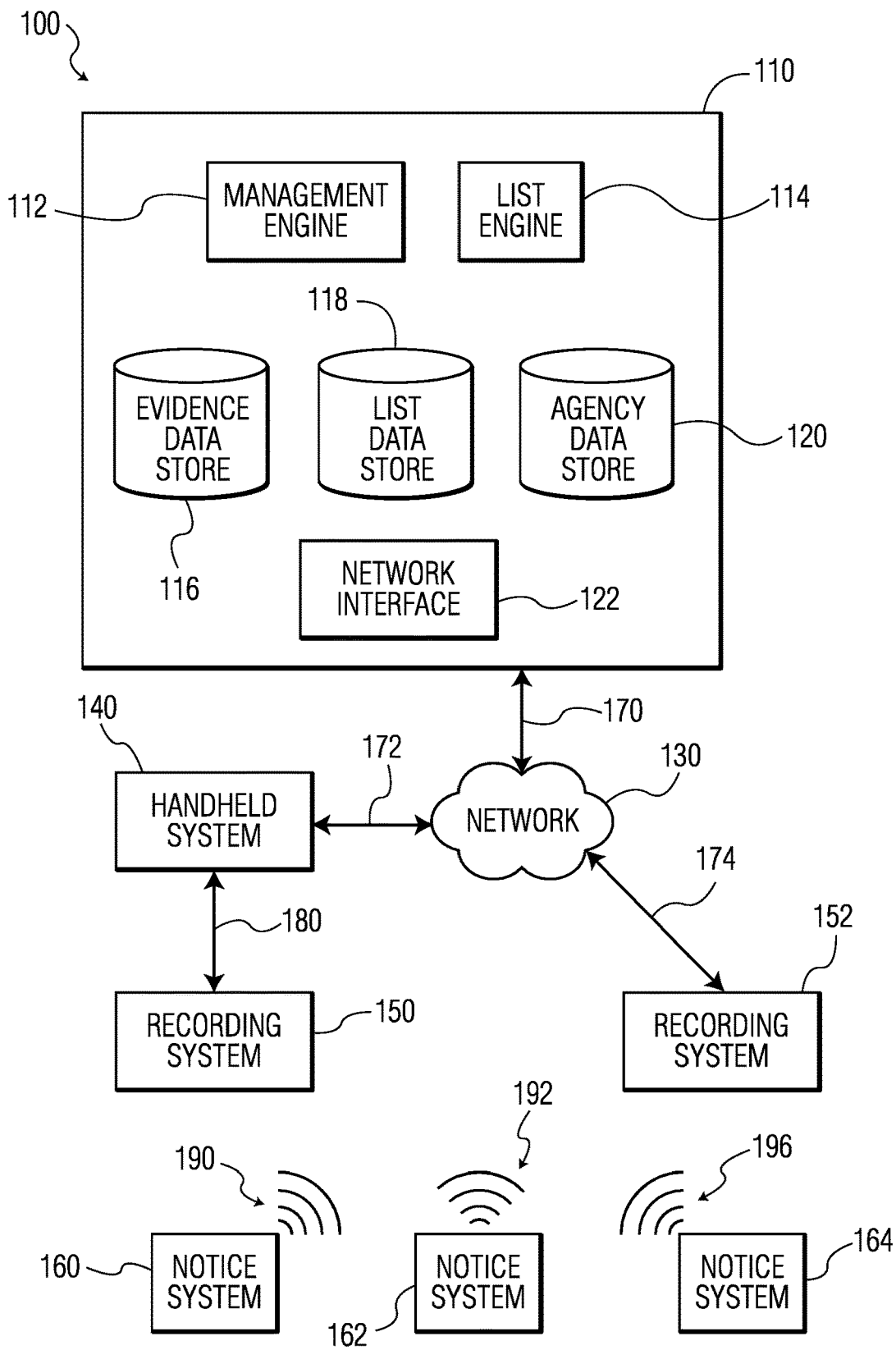
FIG. 1 is a functional block diagram that shows an example of an embodiment of a system for receiving, transmitting, and filtering according to various aspects of the present disclosure.
Figure 3:
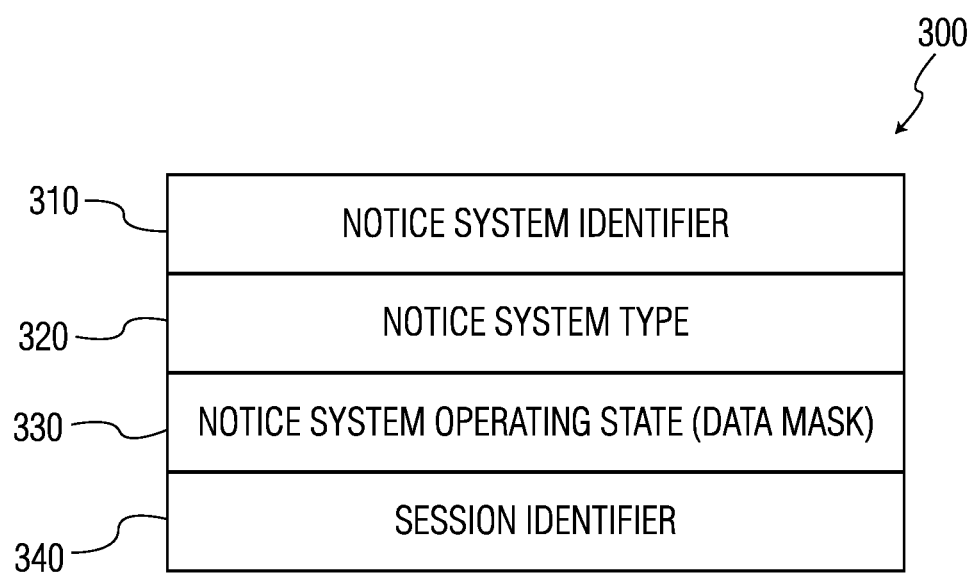
FIG. 3 is a diagram that shows an example of an embodiment of a payload of a message transmitted by a notice system.
Figure 4:
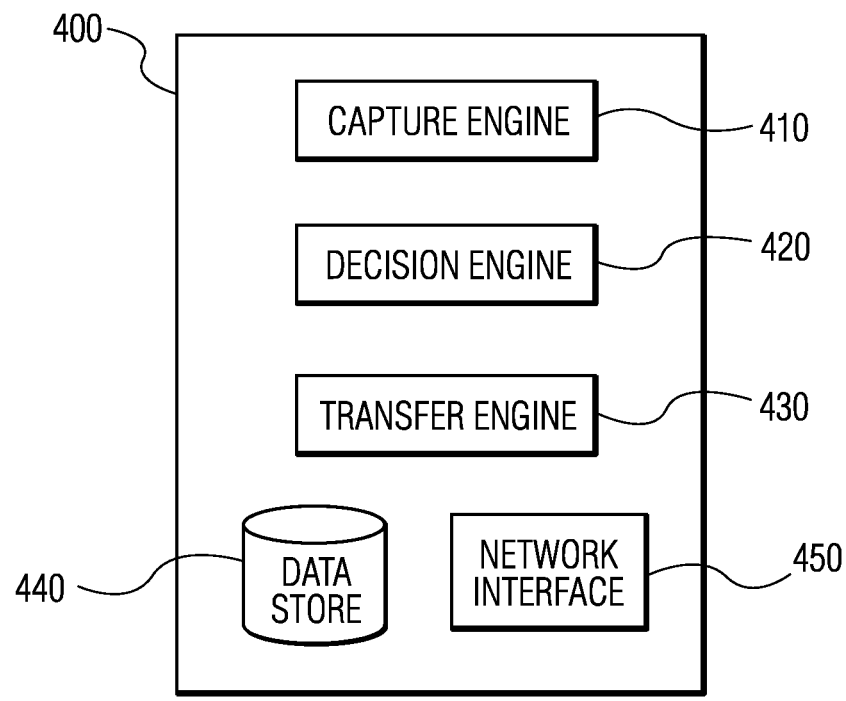
FIG. 4 is a block diagram that shows an example of an embodiment of a recording system.
Figure 5:
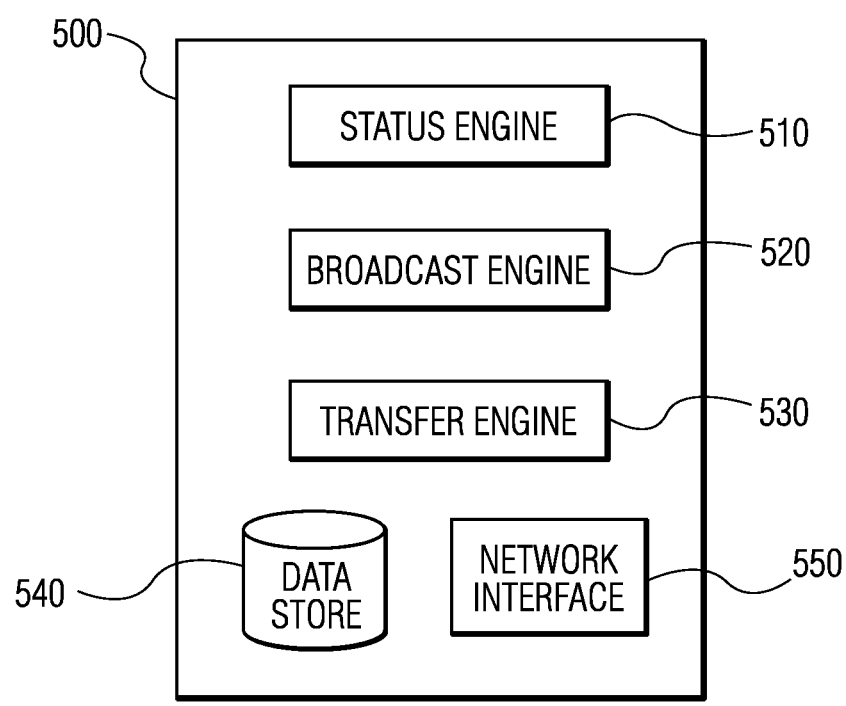
FIG. 5 is a block diagram that shows an example of an embodiment of a notice system.
Figure 6:
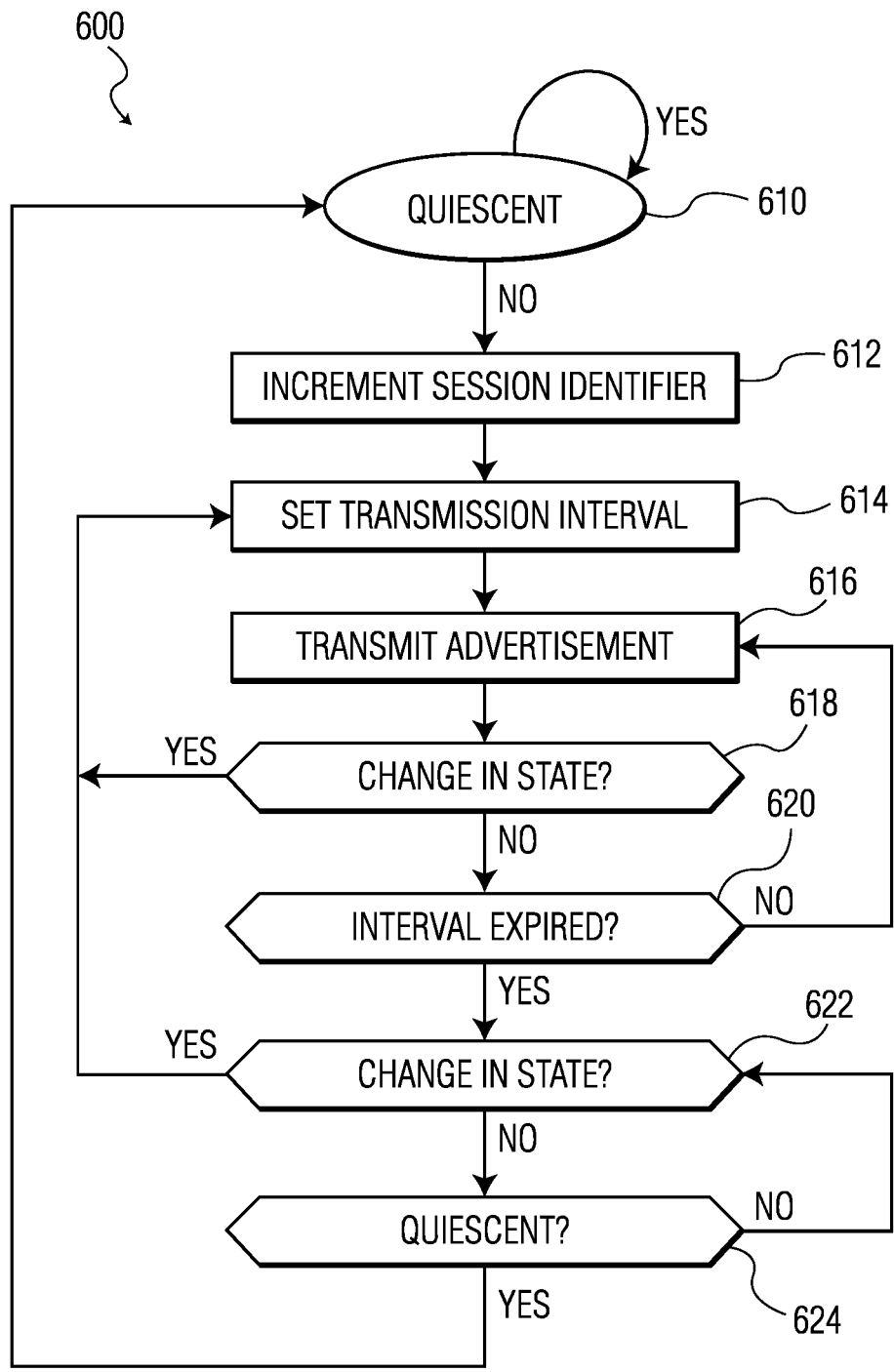
FIG. 6 is a functional block diagram that shows an example of an embodiment of a method for a notice system for setting a value of a session identifier.
Figure 7:
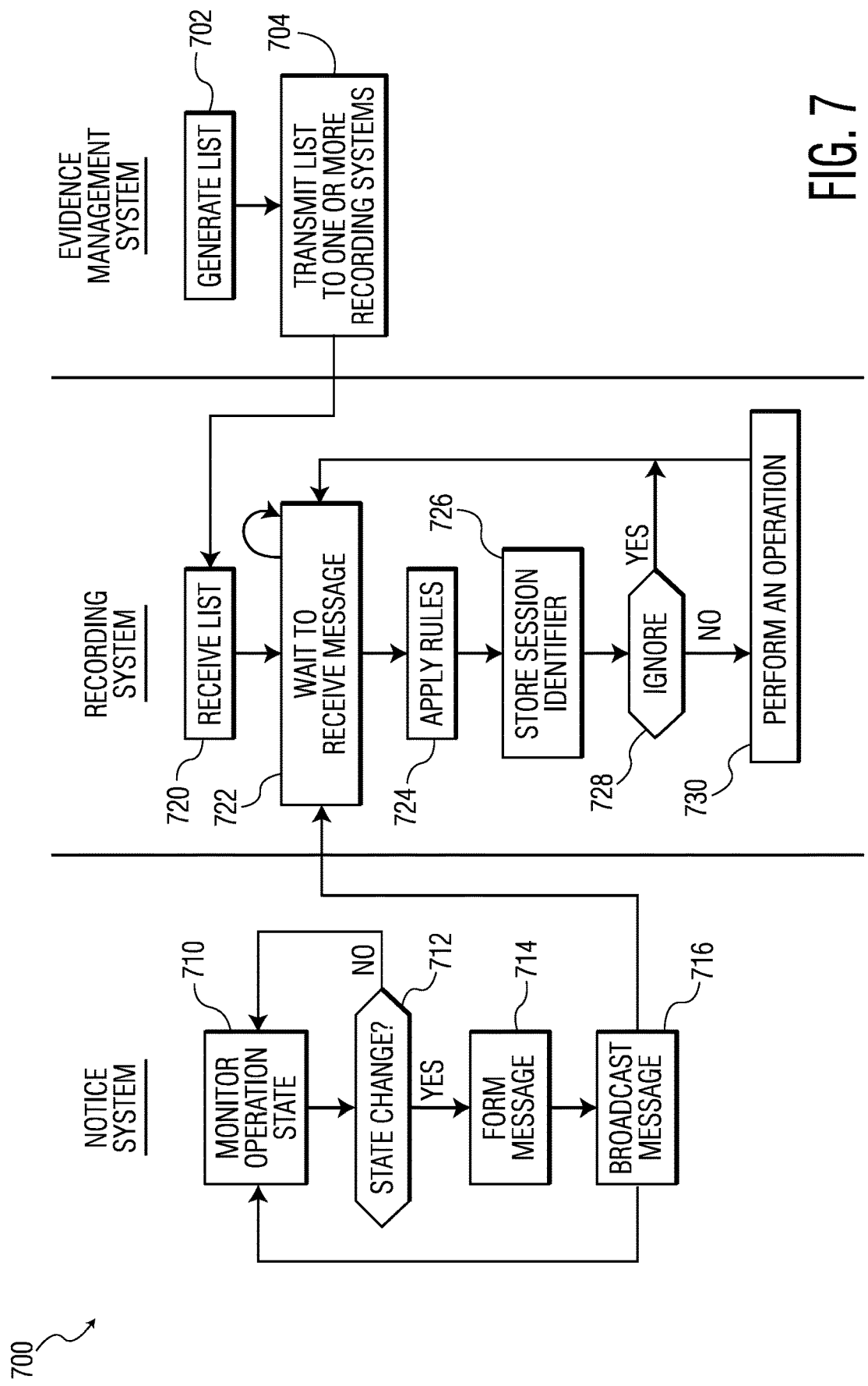
Figure 8:
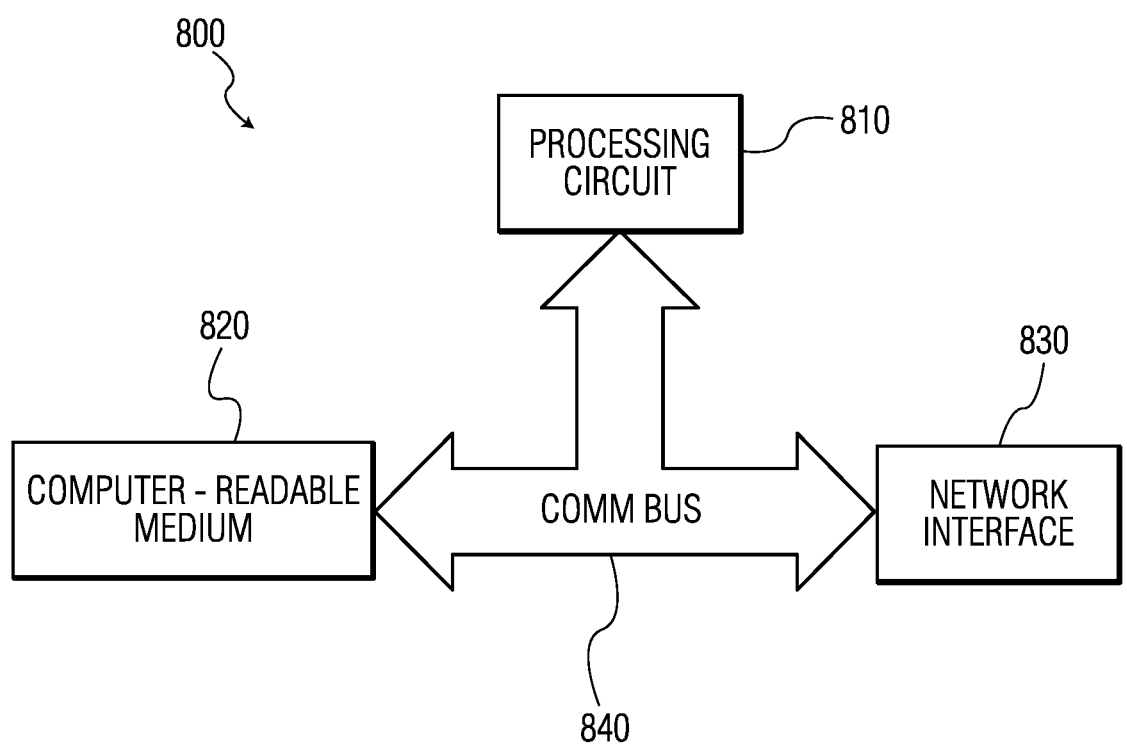
FIG. 8 is a functional block diagram that shows an example of an embodiment of a computing device suitable for use to implement portions of the system according to the present disclosure.

The move towards the Internet of things is establishing an environment where many devices transmit messages. The messages may include data or a request to connect. Many implementations of the Internet of things position a smart phone or a tablet as the device that receives the messages from other devices. As the number of devices that transmit messages increases, the devices that received the messages may benefit from a method of filtering the messages so that device that receives the messages pay attention to only a subset of messages.

A system that collects evidence may also include devices that transmit messages and devices that receive messages. The devices that receive messages in an evidence collection system may also benefit from filtering the messages from devices that transmit messages.

Devices that transmit messages may be referred to as notice systems. Devices that receive messages may be referred to as recording systems. A device may perform the functions of both a recording system and a notice system. A recording system may perform functions in addition to receiving messages. A notice system may perform functions in addition to transmitting notices.

A notice system may transmit one or more messages that provide a notice (e.g., information) of the operational state of the notice system. A notice system may transmit the messages without identifying an intended recipient. Transmitting a message without identifying an intended recipient is referred to herein as broadcasting. The term "transmit" means broadcast, unless the intended recipient is identified. A notice system may broadcast messages using any conventional wired or wireless communication protocol. A notice transmitted by a notice system may include data that indicates the operating state of the notice system.

A recording system may receive zero or more of the notices. A recording system may assess (e.g., analyze) a received notice. A recording system may assess the data carried in the notice. A recording system may determine whether to perform an operation in accordance with the data in a received notice. A recording system may ignore a message. Not ignoring a message is referred to herein as accepting a message. A recording system may perform an operation in accordance with an accepted message. A recording system may receive messages using any conventional wired or wireless communication protocol.

Whether a recording system ignores a message or accepts a message is referred to as filtering messages. A recording system may ignore or accept a message in accordance with analysis of the message. A recording system may ignore or accept a message in accordance with information in a list. An evidence management system may provide a list to a recording system. A recording system may ignore or accept a message in accordance with data in the message. A recording system may store data received from one or more messages. Data that is stored from received messages is referred to herein as historical data. A recording system may ignore or accept a message in accordance with historical data.

A recording system may filter messages in accordance with a list, data from a message, historical data, or any combination thereof. A list may include information regarding other systems (e.g., capture, notice) that relate to the captures system in some way. A list (e.g., white list) may identify notice systems whose messages a captures system should accept. A list (e.g., black list) may identify notice systems whose messages a captures system should ignore.

For example, in some embodiments of an evidence collection system, a camera may perform the functions of a recording system. A conducted electrical weapon ("CEW") may perform the functions of a notice system. A CEW may monitor the state of its own operation. A CEW may detect when a user arms (e.g., switches safety off) the CEW, when the user pulls the trigger or the CEW, and when the user disables (e.g., switch safety on) the CEW. The CEW may transmit a message responsive to detecting a particular state of operation and/or a change in the state of operation. A message transmitted by a CEW may include data regarding the operational state of the CEW and other information.

The CEW may transmit a message each time the user pulls the trigger. A camera may receive one or more messages from one or more CEWs. The camera may filter the one or more messages using information from a list, data from the received message, or data stored from prior received messages (e.g., historical data). There may be a lot of CEWs transmitting messages, so the CEW may receive a lot of messages and may benefit from filtering the messages.

When a camera accepts a message, the camera may perform an operation in response to accepting the message. A camera may start capturing and recording data responsive to accepting a message.

A discussed above, filtering may provide the benefit of enabling a recording system to ignore some messages while accepting others. Ignoring some messages means that a capture device need not respond to all messages transmitted by all notice systems. Using a list, data from a message, historical data, or any combination thereof to determine whether or not to accept a message may enable a capture device to respond only to messages from identified systems, particular types of systems, systems performing identified operations, or to patterns in historical data.

System 100 is an example of an embodiment of a system that collects evidence. System 100 may include evidence management system 110, network, 130, hand-held system 140, recording system 150, recording system 152, notice systems 160-163, and communication links 170-174 and 180.

In addition to receiving messages from notice systems, as discussed above, a recording system detects physical properties in an environment and records (e.g., stores) the information (e.g., data) regarding the physical properties. Recorded information may be analyzed to determine characteristics of the physical properties detected and recorded.

Recorded information may relate to an incident (e.g., event, occurrence). Recorded information may provide a record of an incident. Recorded information may be reviewed to provide a reminder of the incident. Recorded information may be used as evidence to prove the occurrence of an incident. Recorded information may be referred to as evidence.

A recording system may communicate (e.g., transmit, receive) with another electronic device via a short-range wireless communication link. A recording system may communicate with a network and via the network with another electronic device. A recording system may communicate with a network using a long-range communication protocol.

A recording system may transfer captured and recorded information to another system. A recording system may receive a list.

In some embodiments of a recording system, the recording system may detect and record visual (e.g., video, related to light) physical properties and/or audible (e.g., audio, related to sound) physical properties. Visual and audible detected properties may be referred to as video data and audio data. As used herein, "audiovisual" information, data, or recordings refers to video that includes audio, video that is associated with separate audio of the video scene, or audio alone. Use of the term video data may refer to both video and audio data together.

Visual and/or audible physical properties detected and recorded may be within the range of vision and/or hearing of a human. Visual and/or audible physical properties detected and recorded may be outside the range of vision and/or hearing of a human. The capture and storing of video and/or audio data may be accomplished using any suitable technique.

A recording system may create an audiovisual record. Data stored by a recording system may be stored in any suitable format, including but not limited to H.264, MPEG-4, AAC, and WAV. A recording system may convert the recorded information from one format (e.g., analog data, encoding) to another format (e.g., digital data, encoding).

A recording system may communicate (e.g., transmit, receive) data. A recording system may transmit recorded data to another system. A recording system may include any conventional communication circuitry for transmitting and/or receiving data. A recording system may use any conventional wired (e.g., LAN, Ethernet) or wireless communication (e.g., Bluetooth, Bluetooth Low Energy, WiFi, ZigBee, 2G, 3G, 4G, WiMax) protocol. A recording system may store audiovisual data for a period (e.g., shift, day) then transmit the audiovisual data to another system. A recording system may transmit audiovisual information to another system as it is captured (e.g., live streaming).

A recording system may store a record of the operations performed by the recording system. A recording system may store a record of the messages the recording system receives.

A recording system may record data received from a user of the recording system via a user interface (e.g., switch, touch screen) of the recording system. A record of the operations performed by a recording system may be referred to as a log. A recording system may provide a log to another system.

Recording system 150 and recording system 152 perform the functions of recording system discussed herein. In some embodiments, recording system 150 or 152 may include a digital camera such as a wearable (e.g., body-worn, carried) camera that records audiovisual data. In some embodiments, recording system 150 or 152 include an in-car camera or dash cam that records audiovisual data. In some embodiments, recording system 150 or 152 include a wireless microphone. In some embodiments, recording system 150 or 152 include a LIDAR system for detecting and recording the speed, movement, and/or presence of an object.

Recording system 150 or 152 may include separate recording systems, such as a digital camera and a wireless microphone that cooperate to perform the functions of a recording system. For example, video data from a first camera and audio data from a second camera may be combined and/or used. The act (e.g., function, operation) of recording may use any suitable technique known to one of ordinary skill in the art, and so is not described in further detail herein.

In addition to broadcasting messages, as discussed above, a notice system may perform at least one additional function. The further functions performed by a notice system depends on the purpose of the system in which the notice system operates. In an evidence collection system, a notice system may perform a function that is related to the reason that evidence is collected. Performance of one of the further functions of a notice system may be an indication that evidence should be recorded by a recording system. Performance of a further function by a notice system may indicate that an incident has started, may start, or is presently occurring. The further functions of a notice system may be related to a type of incident.

For example, a security agency (e.g., police force) may perform the function of keeping the peace. While keeping the peace, agency personnel may need to use force. An agency may desire to collect evidence of an incident at which agency personnel provide services. An agency may wish to collect evidence regarding the incident prior to, during, and after the use of force. The operation of a cruiser (e.g., vehicle) may be considered to be an application of force or that force is imminent.

Instrument used to administer force include, firearms, CEWs, batons, handcuffs, and pepper spray. Actions that may provide advanced warning of an impending incident include switching on the lights of a cruiser, switching on the siren of a cruiser, rapid acceleration of a cruiser, traveling in a cruiser above a threshold speed, opening of a door of a cruiser, drawing a weapon from a holster, removing a baton, pepper spray, or handcuffs from a holder, administering pepper spray, arming a CEW, pulling the trigger of a CEW, and/or providing a warning arc with a CEW.

As discussed above, a notice system may monitor its state of operation. A notice system may detect that it is operating in a state that may indicate that an incident is impending or in progress. A notice system may detect that it has or is about to administer force. A notice system may detect when its operating state indicates that an incident is likely over or that force is not likely to be applied. A notice system, as discuss above, may transmit messages that include data regarding its state of operation. Data regarding a state of operation may include data that reports that an incident may be imminent, an incident is likely not imminent, an incident is not in progress, force may be applied, force has been applied, and/or that force will not be applied.

A notice system may store a record of the operations performed by the notice system. A notice system may store a record of the messages the notice system transmits. A notice system may record data received from a user of the notice system via a user interface (e.g., safety, trigger, switch) of the notice system. A record of the operations performed by a notice system may be referred to as a log. A notice system may provide a log to another system.

For example, in an embodiment, notice system 160 is an CEW, notice system 162 is a holster for a firearm, and notice system 164 is a system that monitors the operation of a cruiser. A system that monitors the operation of a cruiser may be referred to herein as an in-vehicle monitor. The CEW detects when the CEW has been armed, when the trigger has been pulled, or when the CEW is disarmed. The CEW transmits messages that include data regarding the state of operation of the CEW. The holster includes a detector that detects when the firearm is withdrawn from the holster or when the weapon is positioned in the holster. The holster transmits messages that include data regarding the state of operation of the holster. The in-vehicle monitor monitors the lights, siren, doors, shotgun in the shotgun case, speed of the cruiser, and acceleration of the cruiser. The in-vehicle system transmits messages that include data regarding the state of operation of the cruiser.

The messages transmitted by the notice systems may be received by the recording systems. In some embodiments, recording system 150 or 152 receives one or more notices from notice systems 160, 162, or 164. Recording system 150 or 152 may detect the state of operation of the notice system 160-164. Recording system 150 or 152 may start or stop capturing and recording information in accordance with the one or more of the operating states of notice systems 160-164.

A hand-held system is an electronic system of a suitable size that it may be held in the hand of a person. A hand-held system may transmit data. A hand-held system may receive data. A hand-held system may communicate with one or more recording systems via a short-range wireless communication link. A hand-held system may communicate with a network via a long-range wireless communication link. A hand-held system may communicate using any short-range or long-range communication protocol. A hand-held system may include servers, tablets, computers, portable computers, and/or mobile data terminal (e.g., computer) in a vehicle.

A hand-held system may receive data from a recording system. A hand-held system may provide information to a recording system.

In some implementations, hand-held system 140 includes a smart phone carried by the person using recording system 150. Hand-held system 140 receives data from recording system 150. The data that hand-held system 140 receives includes captured and recorded evidence. Hand-held system 140 provides data to evidence management system 110. The data that hand-held system 140 provides to evidence management system 110 includes captured and recorded evidence. A hand-held system 140 receives data form evidence management system 110, such as one or more lists. A hand-held system 140 provides data to recording system 150 including one or more lists.

A network enables electronic communication. A network enables electronic communication between electronic systems. Electronic systems include notice systems, recording systems, hand-held systems, and evidence management systems. Electronic system may exchange data (e.g., information) via a network. A network may include nodes. Data may be transferred between nodes. A communication link (e.g., data link) permits the transfer of information between nodes of the network. A communication link may include a wired or wireless connection. A node of a network may include an electronic system. An electronic system may provide and/or receive data via other nodes and communication links of the network.

An evidence collection system, also referred to as an evidence management system may collect and manage information. An evidence management system may communicate with other systems to transmit and receive data. An evidence management system may receive recorded data from one or more recording systems. An evidence management system may receive recorded data (e.g., logs) from one or more notice systems and/or recording systems. An evidence management system may provide recorded data, logs to a person or entity. An evidence management system may provide a list to a recording system. An evidence management system may include any conventional communication circuitry for transmitting and/or receiving data. An evidence management system may use any conventional wired or wireless communication protocol for communicating data.

An evidence management system may receive data from one or more agencies. Data from one or more agencies may be stored in an agency data store. An evidence management system may receive data regarding the personnel that work for or under the auspices of an agency. An agency management system may receive information regarding the hierarchy of the personnel of the agency. Information regarding hierarchy may include the job functions of each person, the people that work together in groups, the rank of individuals, and the reporting structure of the agency. An evidence management system may receive data related to an agency. Agency data may include data regarding the equipment (e.g., recording systems, notice systems) owned by the agency, controlled by the agency, and/or issued to personnel of the agency. An agency management system may receive data regarding the assignment (e.g., checkout, issue) of equipment to personnel (e.g., individuals). Information regarding the assignment of equipment to personnel associates equipment to people. Equipment, for example a recording system and one or more notice systems, associated to the same person are associated to each other on the level of that individual. Equipment assigned to people that are members of the same team are associated to each other at the team level. Equipment assigned to the personnel of the same agency are associated to each other at the agency level.

An evidence management system may store data. An evidence management system may store recorded data. An evidence management system may store agency data. Recoded data includes audiovisual data. An evidence management system may store and/or manage data in such a manner that it may be used as evidence in a proceeding, such as a legal proceeding. An evidence management system may store agency data so that it may be used to generate lists.

An evidence management system may organize stored data according to the recording system that captured the data. An evidence management system may organize stored data according to a particular recorded data (e.g., video). An evidence management system may further organize stored data according to agencies (e.g., groups, organizations). An evidence management system may group captured data for storage according to the agency to which the person using the recording system used to capture the data is employed. An evidence management system may store the data of one or more agencies.

An evidence management system may generate (e.g., manipulate, process, create) data. An evidence management system may generate data according to a formula (e.g., recipe, algorithm). An evidence management system may use received and/or store data to generate data. An evidence management system may store generated data. Generated data includes data for one or more lists.

Evidence management system 110 is an example of an embodiment of an evidence management system. Evidence management system 110 performs the functions of an evidence management system discussed herein.

Evidence management system 110 may include management engine 112, list engine 114, evidence data store 116, list data store 118, agency data store 120, and network interface 122.

An evidence management system may perform one or more operations (e.g., functions). An operation may include receiving evidence data, storing evidence data, receiving logs, storing logs, receiving agency data, storing agency data, organizing agency data, generating a list, providing a list, and storing a list.

An engine may perform one or more operations of an evidence management system. An engine may perform one or more functions or a single function. An engine may access stored data to perform a function. An engine may generate data for storage.

The term "engine" as used herein refers to, in general, circuitry, logic embodied in hardware and/or software instructions executable by a processor of a computing device. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

The devices and systems illustrated herein may include one or more computing devices configured to perform the functions of the illustrated engines, though the computing devices themselves have not been illustrated in every case for the sake of clarity.

As understood by one of ordinary skill in the art, a "data store" as described herein may be any suitable device configured to store data for access by a computing device. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in computer-readable medium.

One example of a data store suitable for use with the high capacity needs of the evidence management system 110 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Data stores 116-120 perform the functions of a data store discussed herein. A data store may be implemented using any computer-readable medium. An engine (e.g., 112-114) or a computing device of evidence management system 110 may access data store 116-120 locally (e.g., via data bus), over a network, and/or as a cloud-based service.

In an example of a data store suitable for use with recording systems 150 or 152, which includes reliable storage but also low overhead, is a file system or database management system that stores data in files (or records) on a computer-readable medium such as flash memory, random access memory (RAM), or hard disk drives.

One of ordinary skill in the art will recognize that separate data stores described herein may be combined into a single data store, and/or a single data store described herein may be separated into multiple data stores, without departing from the scope of the present disclosure.

A computer-readable medium may store, retrieve, and/or organize data. As used herein, the term "computer-readable medium" includes any storage medium that is readable by a machine (e.g., computer, computing device, processor, processing circuit). Storage medium includes any devices, materials, and/or structures used to place, keep, and retrieve data (e.g., information). A storage medium may be volatile or non-volatile. A storage medium may include any semiconductor medium (e.g., RAM, ROM, EPROM, Flash), magnetic medium (e.g., hard disk drive), medium optical technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data. A data store may be implemented using any conventional memory, such as ROM, RAM, Flash, or EPROM. A data store may be implemented using a hard drive.

A network interface enables a system or a computing device, as discussed below, to communicate with other devices and/or systems over a network. The functions of a network interface may be performed by circuits, logic embedded in hardware, software instructions executable by a processor, or any combination thereof. The functions performed by a network interface enable a computing device to communicate with anther device. The functions performed by a network interface, whether using hardware or software executed by a processor, may be referred to as services. A device may request the services of a communication interface to communicate with a computing device.

A network interface may communicate via wireless medium and/or a wired medium. A network interface may include circuits, logic embedded in hardware, or software instructions executable by a processor (e.g., wireless network interface) for wireless communication. A network interface may include circuits, logic embedded in hardware, or software instructions executable by a processor (e.g., wired network interface) for wired communication. The circuits, logic embedded in hardware, or software used for a wireless network interface may be the same in whole or in part as the circuits, logic embedded in hardware, or software used for a wired network interface. A network interface may communicate using any conventional wired (e.g., LAN, internet) or wireless communication (e.g., Bluetooth, Bluetooth Low Energy, WiFi, ZigBee, 2G, 3G, LTE, WiMax) protocol.

A management engine may manage, control, schedule, and/or organize the operations performed by an evidence management system. A management engine may perform one or more operations of an evidence management system. The operations performed by an evidence management system are discussed above and herein. A management engine may control and/or perform some or all of the functions of a list engine.

A list engine may generate a list. A list engine may access data stored in agency data store. A list engine may store one or more lists. A list engine may transmit a list to one or more recording systems. A list engine may generate a list for a single recording system. A list engine may generate a list for an associated group of an agency. A list engine may organize the data of a list in any manner. A list engine stores a list or a combination of one or more lists as a file. A file that stores one or more lists may use any conventional file format. A file format for a list may be human readable (e.g., JSON). A file format of a list may be binary.

A list may include data regarding recording systems. A list may include one or more recording system identifiers. A list may include data regarding types of notice systems. A list may include data regarding one or more operating states of one or more notice systems. A list may include one or more notice system identifiers. The data of a list may be related to a recording system. The data of a list may be related to a recording system and the equipment associated to the recording system. The data of a list may be related to a recording system and the equipment related to an individual to whom the recording system has been issued. The data of a list may include information to identify the messages that a recording system should accept. The data of a list may include information to identify the messages that a recording system should ignored. A list may include information regarding notice systems that are related to the user of a notice system.

List 200 is an example of an embodiment of a list. List 200 provides data so that a recording system may identify messages that may be ignored. List 200 includes data 210, 220, and 230. Data 210 pertains to a first recording system, recording system 212, data 220 pertains to a second recording system, recording system 222, and data 230 pertains to an Nth recording system, recording system 232.

Data 212 includes data that identifies the first recording system. Data 212 may include a unique identifier (e.g., serial number) of the first recording system. Data 212 identifies the recording system that should receive data 214, 216, and 218. Data 214 identifies zero or more types of notice systems. Data 216 identifies zero or more operating states of a notice system by notice system type. Data 218 identifiers that identify zero or more notice systems. The information of data 214, 216, and 218 may identify notice systems that are associated with the user of the first recording system.

Data 222 includes data that identifies the second recording system. Data 222 may include a unique identifier (e.g., serial number) of the second recording system. Data 222 identifies the recording system that should receive data 224. Data 224 includes data regarding types of notice systems (e.g., data 214), data regarding operating states of different notice systems (e.g., data 216, and data regarding notice system identifiers (e.g., data 218).

Data 232 includes data that identifies the Nth recording system. Data 232 may include a unique identifier (e.g., serial number) of the second recording system. Data 232 identifies the recording system that should receive data 234. Data 234 includes data regarding types of notice systems (e.g., data 214), data regarding operating states of different notice systems (e.g., data 216, and data regarding notice system identifiers (e.g., data 218).

Data 214 includes data that identifies types of notice systems. A notice system may be of a type. A type of a notice system may be related to a function performed by the notice system. Notice system type may include: holster, CEW, baton, handcuffs, and so forth as discussed above. In this embodiment, notice system type identifies the types of notice systems whose messages a recording system should accept.

Data 216 includes data that identifies the operating status of types of notice systems. The value that represents the operating state of a notice system may be referred to as a "data mask". For example, for system type 1 (e.g., CEW), the values mask1, mask2, and so forth represent the values of the data mask for that type of system that may indicate that a recording system should accept a message. For system type 2 (e.g., vehicle), the values mask1, mask2, and so forth represent the values of the data mask for that type of system that may indicate that a recording system should accept the message. Data 216 may include the value for all of the operating states of a notice system or only some of the values.

A value of a data mask may be presented as a binary or hexadecimal number. A data mask may include one or more bits that represent an operating state of a notice system. For example, Table 1 provides example data mask values for a CEW. Table 2 provides example data mask values for a vehicle.

TABLE 1

Example Data Mask for CEW

| State | Bit 3 | Bit 2 | Bit 1 | Bit 0 |
|---|---|---|---|---|
| Disarmed (e.g., quiescent) | 0 | 0 | 0 | 0 |
| Armed | 0 | 0 | 0 | 1 |
| Trigger pull | 0 | 0 | 1 | 0 |
| Warning Arc | 0 | 1 | 0 | 0 |
| Armed for 20 seconds | 1 | 0 | 0 | 0 |

TABLE 2

Example Data Mask for Vehicle

| State | Bit 7 | Bit 6 | Bit 5 | Bit 4 | Bit 3 | Bit 2 | Bit 1 | Bit 0 |
|---|---|---|---|---|---|---|---|---|
| Quiescent | 0 | 0 | 0 | 0 | 0 | 0 | 0 | 0 |
| Lights on | 0 | 0 | 0 | 0 | 0 | 0 | 0 | 1 |
| Siren on | 0 | 0 | 0 | 0 | 0 | 0 | 1 | 0 |
| Driver's door open | 0 | 0 | 0 | 0 | 0 | 1 | 0 | 0 |
| Acceleration/Deceleration | 0 | 0 | 0 | 0 | 1 | 0 | 0 | 0 |
| Speed > threshold | 0 | 0 | 0 | 1 | 0 | 0 | 0 | 0 |
| Shotgun removed | 0 | 0 | 1 | 0 | 0 | 0 | 0 | 0 |
| Back door open | 0 | 1 | 0 | 0 | 0 | 0 | 0 | 0 |
| Weapon storage opened | 1 | 0 | 0 | 0 | 0 | 0 | 0 | 0 |

Referring to Table 1, the value of the data mask for a CEW will be 0x0 when the CEW is disarmed (e.g., safety switched on). As long as the safety is switched on, the CEW cannot be used, so its operating state is quiescent, which indicates no activity and that the likelihood that an incident is in progress is low. When the CEW is armed, the value of the data mask will become 0x1. Twenty seconds after being armed, the value of the CEW data mask will become 0x9. If the trigger is pulled within 20 seconds after being armed, the value of the data mask will be 0x3 for a period of time. Twenty seconds after being armed, each trigger pull will result in the value of the data mask being 0xB for a period of time. Providing a warning arc after arming and 20 seconds after arming will result in data mask values of 0x5 and 0xD respectively.

Referring to Table 2, the vehicle will be in the quiescent state when the notice system in the vehicles does not detect any of the identified states. When any or all of the operating states of the vehicle occur, the value of the data mask for the vehicle will become the value of the combined bits shown above. For example, if the vehicle is in a quiescent state, the value of the data mask for the vehicle will be 0x00. If the lights and siren are on, the value of the data mask will be 0x03. If the driver's door is open and the shotgun is removed, the value of the data mask will be 0x24. If the lights and siren are on, the driver's door is open, and the weapon storage is open, the value of the data mask for the vehicle will be 0x87.

Data 216 does not need to include all of the possible values of the data mask for a type of system. For example, data 216 for a CEW may include only 0x1 and 0x3 for armed and trigger pull respectively. Data 216 for a vehicle may include only 0x01, 0x2, and 0x3 for the state of operation of the lights and siren only.

Data masks exist for all other types of notice systems.

Data 216 includes data that identifies notice systems. A notice system, or any other system of system 100, may be identified by a unique identifier (e.g., serial number). Data 218 may include the identifiers for notice systems, so that a recording system may accept a message from one or more specific notice systems.

The notice system identifiers of data 218 may identify notice system that are associated with an individual, a team, and/or an agency. If a user is carrying the first recording system, the notice systems that are associated with the first recording system may include the holster, CEW, baton, and handcuffs that are also being carried or that have been issued to the user that is carrying or has been issued the first recording system. The notice system identifiers of the notice systems carried by or issued to the user may be included in data 218.

If the person carrying the first recording system is part of a team, such as a SWAT team, the notice systems that are associated with the first recording system with respect to the SWAT team are the notice systems carried by or issued to each member of the SWAT team. The notice system identifiers of the notice systems carried by or issued to the members of the SWAT team may be included in data 218.

If the person carrying the first recording system is part of an agency, such as a police force, the notice systems that are associated with the first recording system with respect to the agency are the notice systems carried by or issued to each member of the agency. The notice system identifiers of the notice systems carried by or issued to the members of the agency may be included in data 218.

Data 210, 220, and 230 of storage list 200 may be stored together (e.g., one file) or separately (e.g., separate files). List 200 may be sent to all recording systems or data 210, data 220, and data 230 may be sent to the first recording system, the second recording system, and the Nth recording system respectively.

As discussed above, a notice system broadcasts messages. A message broadcast by a notice system may include data regarding the operating state of the notice system. The data may include the data mask of the notice system as discussed above. A message broadcast by a notice system may include the identifier of the notice system. A message broadcast by a notice system may include the type of the notice system that broadcasts the message. The message broadcast by a notice system may include a session identifier. The data regarding the operating state, the system type, the notice system identifier, and the session identifier may be referred to as a payload.

A payload may be included as data in any conventional data packet. A payload may be transmitted as part of any conventional data packet. A recording system may extract the payload from any conventional data packet.

Payload 300 is an example of a payload of a notice system that is included in a data packet for broadcast. Payload 300 includes notice system identifier 310, notice system type 320, notice system operating state (data mask) 330, and session identifier 340.

Notice system identifier 310 may be represented as a number. The number of bits in notice system identifier 310 may be sufficient (e.g., 64 bits) to enable each notice system identifier to be unique.

System type 320 may be represented as a number. The number of bits in notice system type 320 may be sufficient (e.g., 16 bits) to enable each notice system type to be unique.

Notice system operating state 330 may be represented by a number as discussed above with respect to data mask.

Session identifier 340 may be represented as a number (e.g., numerical value). The value of session identifier 340 is incremented each time the notice system exits its quiescent state. Referring to Table 1, each time a CEW is switched from a disarmed state to an armed state, the session identifier of the CEW is incremented. The number of bits of session identifier may be sufficient so that the value of session identifier 340 does not repeat frequently. In an implementation, session identifier is a 64-bit number. A 64-bit number is large enough so that the value of session identifier 340 is not likely to be repeated during the life-time of the notice system.

An example of how the value of the session identifier of a notice system is incremented is provided below in method 600.

Recording system 400 is an example of an embodiment of a recording system. Recording system 400 performs the functions of a recording system discussed above. Recording system 400 includes capture engine 410, decision engine 420, transfer engine 430, data store 440, and network interface 450. Capture engine 410, decision engine 420, and transfer engine 430 perform the functions and includes the structure of an engine discuss above. Data store 440 performs the functions and includes the structure of a data store as discussed above. Network interface 450 performs the functions and includes the structure of a network interface discussed above.

Capture engine 410 may capture and store data related to detected physical properties as discussed above. Capture engine may store captured data in a data store 440.

Transfer engine 430 may transfer captured data from data store 440 via network interface 450 to another system such as an evidence management system (e.g., 110). Transfer engine 430 may transfer captured data as it is captured (e.g., real-time, near real-time, streaming data) via network interface 450 to another system such as a hand-held system (e.g., 140). Transfer engine 430 may receive one or more lists from evidence management system 110 via network interface 450. Transfer engine 430 may store one or more received lists in data store 440. Transfer engine 430 may receive one or more messages via network interface 450 from one or more notice systems, such as from notice systems 160-164 via communications links 190-196. Transfer engine 430 may store received messages in data store 440. Transfer engine 430 may store payload data from a message in data store 440.

Decision engine 420 may read one (e.g., list data 210) or more lists (e.g., list 200) from data store 440. Decision engine 420 may read one or more stored messages from data store 440. Decision engine 420 may read one or more payloads (e.g., payload 300) from data store 440. Decision engine 420 may analyze the data of a list. Decision engine 420 may analyze the data the data of a payload.

Decision engine 420 may make a historic record of the data received in one or more payloads. A historic record of the data is the same as historical data referred to above. For example, Decision engine 420 may include in historical data each new (e.g., not previously received) session identifier from the payloads of all received messages. Decision engine 420 may include in historical data each new session identifier from the payloads of all messages received during a period of time (e.g., last 6 months). Decision engine 420 may store a historical record in data store 440.

Data store 440 may include storage that operates like a circular buffer so that data is over written after a period of time. A circular buffer may be used to implement a pre-event buffer.

Decision engine 420 may determine which messages recording system 400 should accept. Decision engine 420 may determine which messages recording system 400 should ignore. Decision engine 420 may use data from a list to determine which messages to accept or ignore. Decision engine 420 may use historical data to determine which messages to accept or ignore.

Decision engine 420 may perform a function of recording system 400 in accordance with a decision to accept a message. Decision engine 420 may omit performing a function of recording system 400 in accordance with a decision to ignore a message. A function performed by decision engine 420 may include instructing capture engine 410 to begin capturing physical properties and storing data related to the physical properties. A function performed by decision engine 420 may include instructing capture engine 410 to stop capturing physical properties and storing data related to the physical properties. A function performed by decision engine 420 may include instructing capture engine 410 to continue capturing physical properties, but to store data related to the physical properties in a circular pre-event buffer.

Table 3 provides examples rules that decision engine 420 may use to determine that a message should be accepted. The same rules may be applied to determine that a message should be ignored; however, the example of Table 3 considers only the cases for accepting a message. The rules of Table 3 may include Boolean logic that operates on data from a list and/or historic data. Decision engine 420 may use one or more of the rules from Table 3 to determine whether to accept a message. Decision engine 420 may accept a message if the result of the Boolean logic of one or more rules is true (e.g., a "1"). Decision engine 420 may ignore a message if the result of the Boolean logic of all rules is false (e.g., a "0").

TABLE 3

Example Rules for Accepting a Message

| Rule No. | Data 1 | Operation | Data 2 |
|---|---|---|---|
| 1 | Notice system identifier from message payload (e.g., 310) | Equals | Any notice system identifier from list (e.g., 218) |
| 2 | System type from payload (e.g., 320) | Equals | Any system type from list (e.g., 214) |
| 3 | System type (e.g., 320) and operating state (data mask) (e.g., 330) from payload | Equals | Any system type and data mask from list (e.g., 216). |
| 4 | Session identifier from payload (e.g., 340) | Does not Equal | Any historic session identifier (from data store 440) |
| 5 | System type (e.g., 320) | Equals and | Any system type from list (e.g., 214) |
|  | session identifier (e.g., 340) from payload | Does not Equal | Any historic session identifier (from data store 440) |

Rule 1 of Table 3 enables decision engine 420 to accept messages from notice systems identified in list 200. The notice systems in list 200 may be notice systems that are related to the individual, related to a team of the individual, or related to an agency of the individual that uses recording system 400 as discussed above.

Rule 2 of Table 3 enables decision engine 420 to accept messages from notice systems of the type identified in list 200. Rule 2 does not consider whether the notice systems of the identified types are related to the individual that uses recording system 400.

Rule 3 of Table 3 enables decision engine 420 to accept messages from notice systems that are presently operating in an identified state. For example, rule 3 may enable decision engine 420 to accept messages from CEWs that are presently operating in a trigger pull state or from an in-vehicle system presently operating in a lights-on state. Rule 3 does not consider whether the notice systems of the identified types are related to the individual that uses recording system 400.

Rule 4 of Table 3 enables decision engine 420 to accept messages from notice systems whose session identifier 340 is new to (e.g., not previously received by) decision engine 420. As discussed above, decision engine 420 may keep a record (e.g., non-volatile) of session identifiers received in messages. In some embodiments, decision engine 420 stores session identifier 340 only for those messages from notice systems identified in list 200 (e.g., 218). In some embodiments, decision engine 420 stores session identifier 340 from all messages.

As discussed below, a new session identifier may indicate that a notice system is part of or will be part of a new incident, so rule 4 enables decision engine 420 to accept those messages. As will be seen below, a notice system may send out more than one message with the same session identifier. If decision engine 420 applies only rule 4 when determining whether to accept a message, decision engine 420 will accept the first message 300 that includes the new value for session identifier 340 and ignore all subsequent messages 300 that have the same value as the previously received session identifier 340.

Decision engine 420 may apply one rule or more than one rule to determine whether to accept a list. Rule 5 is a combination of rule no. 2 and rule no. 4. Any two or more rules may be combined using an "and" or "or" operation.

Notice system 500 is an example of an embodiment of a notice system. Notice system 500 performs the functions of a notice system discussed above. Notice system 500 includes status engine 510, broadcast engine 520, transfer engine 530, data store 540, and network interface 550. Status engine 510, broadcast engine 520, and transfer engine 530 perform the functions and includes the structure of an engine discuss above. Network interface 550 performs the functions and includes the structure of a network interface discussed above.

Status engine 510 monitors the operating state of notice system 500. Status engine 510 may receive data from sensors of notice system 500. A sensor may detect a physical property of an object or a portion of an object. The physical property may relate to an operating state of the object or a portion of the object. An operating state may include an inactive state or an inactive state. An object or a portion of an object may perform a function while in an active state. An object or a portion of an object may cease to perform a function while in an inactive state. A sensor may monitor (e.g., detect over time, detect periodically) a physical property of an object or a portion of an object. A sensor may report data regarding a physical property or a change in the physical property of an object or a portion of an object. A sensor may report data regarding a physical property of an object via a signal. Data from sensors that report the physical properties of respective portions of an object may be interpreted to understand the operating of the state of the object.

Status engine 510 may use data from sensors to determine the present state of operation of notice system 500. Status engine 510 may determine a value of a data mask. Status engine 510 may update and/or change a value of a data mask to reflect the present operating state of notice system 500. Status engine 510 may store the value of a data mask in data store 540.

Status engine 510 may determine a value of a session identifier. Status engine 510 may determine when to increment the value of a session identifier. Status engine 510 may use data regarding a present or past operating state of notice system 500 to determine when to increment a session identifier.

Status engine 510 may write information to a log regarding the operating state of notice system 500 and/or a change in the operating state of notice system 500. Status engine 510 may record a data and/or time of each change in the operating state of notice system 500. Status engine 510 may record a data and/or time when the value of a session identifier is incremented. Status engine 510 may maintain a record of a present value of a session identifier and a previous value of the session identifier. Status engine 510 may detect and/or control a change in the value of a session identifier. In some embodiments, Status engine 510 performs method 600, discussed below, to determine a value of a session identifier. Status engine 510 may store information, such as log information, in data store 540.

Broadcast engine 520 may broadcast a message via network interface 550. Broadcast engine 520 may include a payload in a message. A payload may include the data identified in payload 300. A notice system identifier (e.g., 310) and a notice system type (e.g., 320) may be stored in data store 540. A notice system operating state (data mask) (e.g., 330) may be stored in data store 540 and/or provided by status engine 510 upon request or when needed by broadcast engine 520. A session identifier (e.g., 3340) may be stored in data store 540 and/or provided by status engine 510 upon request or when needed by broadcast engine 520.

Transfer engine 530 may transfer log data from data store 540 via network interface 550 to another system such as an evidence management system (e.g., 110). Transfer engine 530 may transfer log data via network interface 450 to another system such as a hand-held system (e.g., 140). Transfer engine 530 may receive data from a system via network interface 550. Transfer engine 530 may store received data in data store 540.

As discussed above, the value of a session identifier is incremented each time a notice system exits its quiescent state. Method 600 is an example implementation of a method for determining the value of a session identifier. Status engine 510 and broadcast engine 520 may cooperate to perform methods 600 to increment the session identifier and to broadcast a message that includes the session identifier.

Method 600 may include functions quiescent 610, increment 612, interval 614, transmit 616, change 618, expired 620, change 622, and quiescent 624.

Execution of quiescent 610 indicates a notice system is in a quiescent state. In the examples of data masks shown in Tables 1 and 2, a notice system is in a quiescent state when the value of the data mask of the notice system is zero (e.g., 0x00). While executing quiescent 610, status engine 510 periodically checks the value of the data mask to determine if any bits are set to nonzero values. If the value of the data mask remains zero, status engine 510 continues to execute quiescent 610. If any data mask bit changes to a nonzero value, the notice system has started to perform an operation (e.g., function). When a notice system starts to perform an operation, status engine 510 leaves the quiescent state and begins execution of increment 612.

Increment 612 increments the value of the session identifier. Incrementing may be accomplished by adding a value (e.g., 1) to the present value to get the new value. The new value of the session identifier may be stored in memory. Increment 612 may be executed by status engine 510. Execution moves to interval 614.

Interval 614 sets a transmission interval for the notice system. During the interval (e.g., 30 seconds), the notice system broadcasts messages that include a payload, such as payload 300. Status engine 510 may execute interval 614.

Transmit 616 broadcasts a message. In transmit 616, status engine 510 may instruct broadcast engine 520 to transmit a message that includes the data of payload 300. Broadcast engine 520 may get the data for payload 300 from data store 540. Broadcast engine 520 may operate independently (e.g., in parallel to) status engine 510. Status engine 510 may move to execution of change 618 while broadcast engine 520 broadcasts the message.

Change 618 determines whether the notice system has experienced a change in state. A change in state includes a change from one operating state to another operating state. Refer to Tables 1 and 2 for examples of a change in state. A change in the value of a data mask indicates a change in state. A change in state includes returning to a quiescent state. If there has been a change in state, execution loops back to interval 614, where the interval is set to its original value so that messages with the new value of the data mask are transmitted for the interval. If there has been no change in state, execution moves to expired 620. Status engine 510 may execute change 618.

Expired 620 determines whether or not the transmission interval has ended. If the transmission interval has not expired, execution loops back to transmit 616. If the transmission interval has expired, execution moves to change 622. Status engine 510 may execute expired 620.

Change 622 performs the same function as change 618. If there has been a change in state, execution loops back to interval 614. If there has been no change in state, execution moves to quiescent 624. Status engine 510 may execute change 622.

Quiescent 624 determines whether the present state of the notice system is the quiescent state (e.g., data mask bits are all zero). If the notice system is in a quiescent state, execution loops back to quiescent 610. If the notice system is not quiescent (e.g., some data mask bit is non-zero) execution loops back to change 622.

Method 700 shows an example of the operation and cooperation of example embodiments of a notice system (e.g., notice system 500), a recording system (e.g., recording system 400), and an evidence management system (e.g., evidence management system 110).

In function 702, the evidence management system generates a list. An example of generating a list is discussed above with respect to list engine 114. An example of the data of a list is provide in list 200.

In function 704, the evidence management system transmits the list to the recording system. An example of transmission of a list is provided above with respect to management engine 112 and network interface 122.

In function 720, the recording system receives the list. An example of receiving a list is discussed above with respect to transfer engine 430 and network interface 450.

In function 722, the recording system waits to receive a broadcast of a message.

In function 710, the notice system monitors the operation of the notice system. In function 712, the notice system determines whether the operating state of the notice system has changed. An example of monitoring and detecting a change in the operating state of a notice system is discussed above with respect to status engine 510. If the operating state of the notice system has changed, the notice system performs function 714. If the operating state of the notice system has not changed, the notice system returns to function 710.

In function 714, the notice system forms a message. The message includes a payload. An example of forming a message is discussed above with respect to status engine 510. An example of the data in a payload is discussed above with respect to payload 300.

In function 716, the notice system broadcasts the message. An example of broadcasting a message is discussed above with respect to broadcast engine 520 and network interface 550. After the notice system performs function 716, the notice system returns to function 710.

Once notice system has transmitted a message, the recording system may receive the message. When the recording system receives the message, the recording system applies rules to the payload of the message and/or the list to determine whether to accept the message. An example of applying rules to determine whether the recording system should receive the message is discussed above with respect to decision engine 420.

In function 726, the recording system stores the session identify from the payload of the message to maintain a historical record of session identifiers that it has received. An example of creating and maintaining a historical record of session identifiers is discussed above with respect to decision engine 420.

In function 728, the recording system assesses the result of applying the rules (e.g., function 724) to determine whether to accept or ignore the message. An example of applying the rules to determine whether to accept or ignore a message is discussed above with respect to decision engine 420 and Table 3. If the recording system determines that the message should be ignored, the recording system returns to function 722. If the recording system determines to accept a message, the recording system moves to function 730.

In function 730, the recording system performs an operation. Performance of an operation in response to accepting a message is discussed above. From function 730, the recording system returns to function 722 to wait for another message from a notice system.

A computing device may perform a function. A computing device may provide a result of performing a function. A computing device may receive information, manipulate the received information, and provide the manipulated information. A computing device may execute a stored program to perform a function.

A computing device may provide and/or receive digital data via a conventional bus using any conventional protocol. A computing device may provide and/or receive digital data via a network connection. A computing device may store information and retrieve stored information. Information received, stored, and/or manipulated by the computing device may be used to perform a function and/or to perform a stored program.

A computing device may control the operation and/or function of other circuits and/or components of a system. A computing device may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a computing device and other circuits and/or components via any type of buss including any type of conventional data/address bus.

For example, computing device 800 is an example embodiment of a computing device. Computing device 800 is suitable for use as a computing device in the present disclosure. Computing device 800 performs the functions of a computing device discussed above. Computing device 800 may include processing circuit 810, computer-readable medium 820, network interface 830, and communication bus 840.

Network interface 830 and computer-readable medium 820 perform the functions of and include the structure of a network interface and computer-readable medium respectively discussed above.

While multiple different types of computing devices were discussed above, computing device 800 describes various elements that are common to many different types of computing devices. While computing device 800 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that computing device 800 may be any one of any number of currently available or yet to be developed devices.

A processor circuit includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a radio, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital data.

A processing circuit may have a low power state in which only a portion of its circuits operate or it performs only certain function. A processing circuit may be switched (e.g., awoken) from a low power state to a higher power state in which more or all of its circuits operate or it performs additional certain functions.

Computer-readable medium may store data and/or program modules that are immediately accessible to and/or are currently being operated on by the processing circuit. In this regard, a processing circuit may perform or control the operation of a computing device by executing a stored program.

A communication bus transfers data between the components of a computing device. A communication bus may transfer data between computing devices. A communication bus may include a control bus, an address bus, and/or a data bus. A control bus may control access to the data and/or address bus. An address bus may specify a location of where data and/or control may be sent and/or received. Data, address, and/or control transfer via a communication bus may be unidirectional. Data, address, and/or control transfer via a communication bus may be bidirectional. Data, address, and/or control may be transferred serially and/or in parallel.

A communication bus may include any conventional control bus, address bus, and/or data bus (e.g., internal bus, expansion bus, local bus, front-side-bus, USB, FireWire, Serial ATA, AGP, PCI express, PCI, HyperTransport, InfiniBand, EISA, NuBus, MicroChannel, SBus, I2C, HIPPI, CAN bus, FutureBus). A communication bus may use any protocol, whether conventional or custom (e.g., application specific, proprietary) to transfer data.

A communication bus may transfer data, address, and/or control using any transmission medium. A transmission medium includes any material (e.g., physical) substance capable of propagating waves and/or energy (e.g., optical, electrical, electro-magnetic).

In a basic configuration, computing device 800 may include at least one processing circuit 810 and computer-readable medium 820 connected by communication bus 840.

Processing circuit 810, computer-readable medium 820, and communication bus 840 may perform the functions and include the structures of a processing circuit, a computer-readable medium, and a communication bus respectively discussed above.

Depending on the configuration of computing device 800, computer-readable medium 820 may be a volatile or non-volatile computer-readable medium, including read only memory ("ROM"), random access memory ("RAM"), EEPROM, and/or flash memory.

Some or all of the functions of network interface may be performed by processing circuit 810. Network interface 830 may include one or more wireless interfaces or physical communication interfaces.

Suitable implementations of computing devices that include a processor 810, computer-readable medium 820, communication bus 840, and network interface circuit 830 are known and commercially available. For ease of illustration and because it is not important for an understanding of the claimed subject matter, computing device 800 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, Bluetooth low energy, USB, or other suitable connections protocols using wireless or physical connections. Similarly, the computing device 800 may also include output devices such as a display, speakers, printer, etc. Since these devices are well known in the art, they are not illustrated or described further herein.

While the preferred embodiments of the invention have been illustrated and described, it will be appreciated that various changes can be made therein without departing from the spirit and scope of the invention. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. In the claims, the term "provided" is used to definitively identify an object that not a claimed element of the invention but an object that performs the function of a workpiece that cooperates with the claimed invention.

The location indicators "herein", "hereunder", "above", "below", or other word that refer to a location, whether specific or general, shall be construed to refer to any location in the specification.

What is claimed is:

1. A method performed by a server and a first camera for filtering messages, the method comprising:

the server performs:
receiving information from an agency, the information includes
(1) a plurality of first identifiers, each first identifier identifies one respective first system of a plurality of first systems,
(2) a plurality of second identifiers, each second identifier identifies one respective camera of a plurality of cameras, the plurality of second identifiers includes the second identifier of the first camera,
(3) a plurality of third identifiers, each third identifier identifies one respective person of a plurality of persons of the agency, and
(4) a data that associates each first identifier and each second identifier to a respective one third identifier whereby the data identifies a respective person to whom each of the plurality of first systems and each of the plurality of cameras is assigned by the agency, the plurality of first systems selected from a group of conducted electrical weapons ("CEWs") and holsters:
in accordance with the data, identifying one or more first systems of the plurality of first systems assigned to a person to whom the first camera is assigned thereby determining the one or more first systems associated with the first camera;
generating, in accordance with identifying, a list that includes one or more entries, each entry includes the first identifier of one of the one or more first systems associated with the first camera; and
transmitting the list to the first camera; and
the first camera performs:
receiving the list;
receiving one or more messages wirelessly transmitted from at least one of a CEW and a holster of a notice system, each message comprises a fourth identifier of the CEW or the holster that sent the message; and
ignoring the one or more messages unless the fourth identifier is a same identifier as one first identifier in the one or more entries of the list.

2. The method of claim 1 further comprising determining, using the information from the agency, an association between the first camera and a second camera, the first camera and the second camera assigned to respective members of a team, wherein generating further comprises generating the list to include the first identifier of one or more first systems selected from the group of CEWs and holsters, the one or more first systems associated with the one or more second camera.

3. A server for generating a list for a first camera to use to filtering messages, the system comprising:
a processing circuit;
a network interface; and
a computer-readable medium having computer-executable instructions stored thereon that, in response to execution by the processing circuit, cause the server to:
receive information from an agency, the information includes
(1) a plurality of first identifiers, each first identifier identifies one respective first system of a plurality of first systems,
(2) a plurality of second identifiers, each second identifier identifies one respective camera of a plurality of cameras, the plurality of second identifiers includes the second identifier of the first camera,
(3) a plurality of third identifiers, each third identifier identifies one respective person of a plurality of persons of the agency, and
(4) a data that associates each first identifier and each second identifier to a respective one third identifier whereby the data identifies a respective person to whom each of the plurality of first systems and each of the plurality of cameras is assigned by the agency, the plurality of first systems selected from a group of conducted electrical weapons ("CEWs") and holsters;
in accordance with the data, identify one or more first systems of the plurality of first systems assigned to a person to whom the first camera is assigned thereby determining the one or more first systems associated with the first camera;
generate, in accordance with identifying, a list that includes one or more entries, each entry includes the first identifier of one of the one or more first systems associated with the first camera; and
transmit the list, via the network interface, to the first camera whereby the first camera accepts only those messages wirelessly transmitted from CEWs and holsters of a notice system that are sent by the one or more first systems as identified in the one or more entries of the list.

4. The method of claim 1 wherein:
the plurality of first systems further include an in-vehicle monitor; and
determining comprises determining, using the information from the agency, that the first camera and the in-vehicle monitor are assigned to a same vehicle.

5. The method of claim 1 further comprising the first camera further performs: recording video data in response to only those messages from the one or more first systems identified in any one entry of the list.

6. The method of claim 1 wherein:
each entry of the list further comprises a data mask, the data mask being of a type of the one respective first system identified by the first identifier of the entry;
each of the one or more messages comprises operating state data of the CEW or holster that sent the message; and
the first camera further performs:
recording video data in response to the fourth identifier of the message matching the first identifier of one entry of the list and a true result from a Boolean operation using the operating state data from the message and the data mask from the one entry.

7. The server of claim 3 wherein the server determines, using the information from the agency, that the first camera is further associated with the one or more first systems because the first camera and each of the one or more first systems are assigned to a same user.

8. The server of claim 3 wherein the server determines, using the information from the agency, that the first camera is further associated with the one or more first systems because the first camera and each of the one or more first systems are assigned to a same team.

9. The server of claim 3 wherein the server determines, using the information from the agency, that the first camera is further associated with the one or more first systems because the first camera and each of the one or more first systems are assigned to a same agency.

10. The server of claim 3 wherein the server determines, using the information from the agency, that the first camera is further associated with an in-vehicle monitor because the first camera and the in-vehicle monitor are assigned to a same vehicle.

11. The server of claim 3 wherein:
each entry of the list further comprises a data mask, the data mask being of a type of the one respective first system identified by the first identifier of the entry;
each message of one or more messages received by the first camera comprises a fourth identifier and operating state data of the CEW or holster that sent the message; and
the first camera records video data in response to the fourth identifier of the message matching the first identifier of one entry of the list and a true result from a Boolean operation using the operating state data from the message and the data mask from the one entry.

12. A first camera comprising:
a memory;
a processing circuit that executes computer-executable instructions stored in the memory to perform functions of a decision engine and a capture engine,
the capture engine captures video data and stores the video data in the memory; and
a network interface; wherein:
the first camera is worn or carried by a user;
the network interface receives a list, the list includes one or more entries, each entry includes a first identifier, the first identifier identifies a first system selected from a group consisting of conducted electrical weapons ("CEWs") and holsters, the one or more first systems and the first camera assigned to the user by an agency, the list determined by a server using information from the agency, the information includes:
(1) a plurality of first identifiers, each first identifier identifies one respective first system of a plurality of first systems,
(2) a plurality of second identifiers, each second identifier identifies one respective camera of a plurality of cameras, the plurality of second identifiers includes the second identifier of the first camera,
(3) a plurality of third identifiers, each third identifier identifies one respective person of a plurality of persons of the agency, and
(4) a data that associates each first identifier and each second identifier to a respective one third identifier whereby the data identifies the one or more first systems and the first camera as being assigned to the user;
the network interface receives one or more messages wirelessly transmitted from one or more CEWs or holsters, each message includes a fourth identifier that identifies the CEW or holster that sent the message;
the decision engine compares the fourth identifier of each message to the one or more first identifiers of the one or more entries of the list;
responsive to finding a match between the fourth identifier of any one message and the first identifier of any one entry of the list, the decision engine instructs the capture engine to begin capturing the video data; and
responsive to finding that the fourth identifier of any one message does not match the first identifier of all entries of the list, the decision engine ignores the one message.

13. The first camera of claim 12 wherein:
each entry of the list further comprises a data mask, the data mask being of a type of the one respective first system identified by the first identifier of the entry;
each of the one or more messages further comprises operating state data of the CEW or holster that sent the message; and
the decision engine further:
records video data in response to the fourth identifier of the message matching the first identifier of one entry of the list and a true result from a Boolean operation using the operating state data from the message and the data mask from the one entry.

14. The first camera of claim 12 wherein:
the first camera is further assigned to a vehicle; and
at least one entry of the one or more entries of the list corresponds to an in-vehicle monitor assigned to the vehicle.

15. The first camera of claim 12 wherein the server determines, using the information from the agency, that the first camera is further associated with the one or more first systems because the first camera and each of the one or more first systems are assigned to a same team.

16. The first camera of claim 12 wherein the server determines, using the information from the agency, that the camera is further associated with the one or more first systems because the camera and each of the first systems are assigned to a same agency.

* * * * *